(12) United States Patent
Monjuvent et al.

(10) Patent No.: US 8,245,747 B2
(45) Date of Patent: Aug. 21, 2012

(54) TIRE VALVE AND PROCESS FOR REMOVING IT

(75) Inventors: Jérôme Monjuvent, Ennezat (FR); Patrick Botte, Cebazat (FR); Julien Moynet, Clermont-Ferrand (FR); Matteo Gosi, Cremona (IT)

(73) Assignees: Michelin Recherche et Technique S.A., Granges-Paccot (CH); Wonder S.p.A., Cremona (IT); TRW Automotive U.S., LLC, Livonia, MI (US)

( * ) Notice: Subject to any disclaimer, the term of this patent is extended or adjusted under 35 U.S.C. 154(b) by 566 days.

(21) Appl. No.: 12/304,082

(22) PCT Filed: May 29, 2007

(86) PCT No.: PCT/EP2007/055196
§ 371 (c)(1),
(2), (4) Date: Jul. 14, 2009

(87) PCT Pub. No.: WO2007/141161
PCT Pub. Date: Dec. 13, 2007

(65) Prior Publication Data
US 2011/0203711 A1 Aug. 25, 2011

Related U.S. Application Data

(60) Provisional application No. 60/830,690, filed on Jul. 14, 2006.

(30) Foreign Application Priority Data

Jun. 9, 2006 (FR) .................................. 06 05139

(51) Int. Cl.
*B60C 23/10* (2006.01)
(52) U.S. Cl. ....... 152/427; 152/431; 73/146.8; 29/221.5
(58) Field of Classification Search .......... 152/427–428, 152/431; 73/146.3, 146.8; 29/221.5
See application file for complete search history.

(56) References Cited

U.S. PATENT DOCUMENTS

| | | | | |
|---|---|---|---|---|
| 5,181,977 | A * | 1/1993 | Gneiding et al. | 152/429 |
| 5,211,782 | A * | 5/1993 | Thelen | 152/427 |
| 5,257,642 | A * | 11/1993 | Worth | 137/230 |
| 6,005,480 | A | 12/1999 | Banzhof et al. | |
| 6,278,361 | B1 | 8/2001 | Magiawala et al. | |
| 6,588,446 | B2 * | 7/2003 | Reinhardt | 137/223 |
| 6,782,741 | B2 | 8/2004 | Imbert | |

(Continued)

FOREIGN PATENT DOCUMENTS
WO    WO 2005/123421 A    12/2005

*Primary Examiner* — Jason Bellinger
(74) *Attorney, Agent, or Firm* — Buchanan Ingersoll & Rooney PC

(57) ABSTRACT

Inflation valve having a tube and designed for use in an assembly consisting of a tire and a wheel, the valve having: (i) snap-in mechanism that enable the valve to be fixed in a cylindrical hole of circular cross-section formed in a rim of the wheel; (ii) mechanism suitable for receiving a torque intended to rotate the valve in the hole; (iii) an attachment piece provided with a mechanism for attaching the valve to a unit designed to be fitted inside the tire; the mechanism the valve to be attached to the unit being such that the attachment piece is separated from the unit when the valve is rotated in the hole in a predetermined rotation direction.

4 Claims, 5 Drawing Sheets

U.S. PATENT DOCUMENTS

| | | |
|---|---|---|
| 6,851,308 B2 | 2/2005 | Fonteneau |
| 7,086,412 B2 * | 8/2006 | Uleski ............................ 137/223 |
| 7,145,443 B2 * | 12/2006 | Ito et al. ......................... 340/442 |
| 2003/0209065 A1 | 11/2003 | Fonteneau |
| 2005/0087228 A1 * | 4/2005 | Uleski ............................ 137/223 |
| 2005/0217774 A1 | 10/2005 | Borot |

* cited by examiner

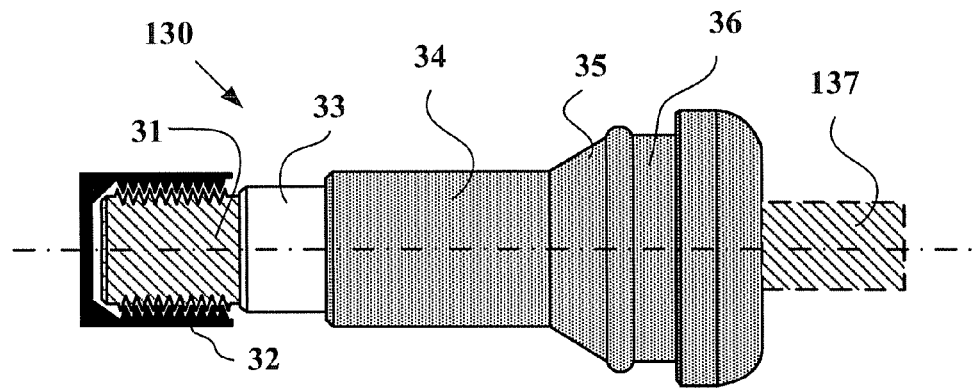
FIG. 4 - PRIOR ART
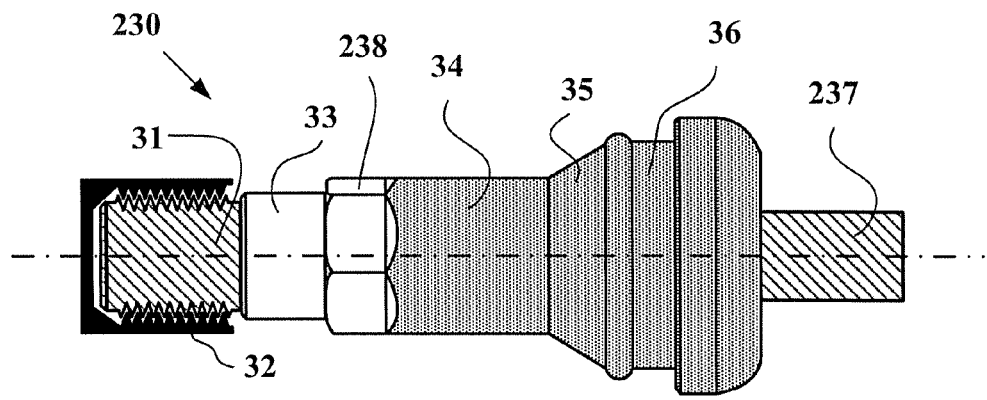
FIG. 5
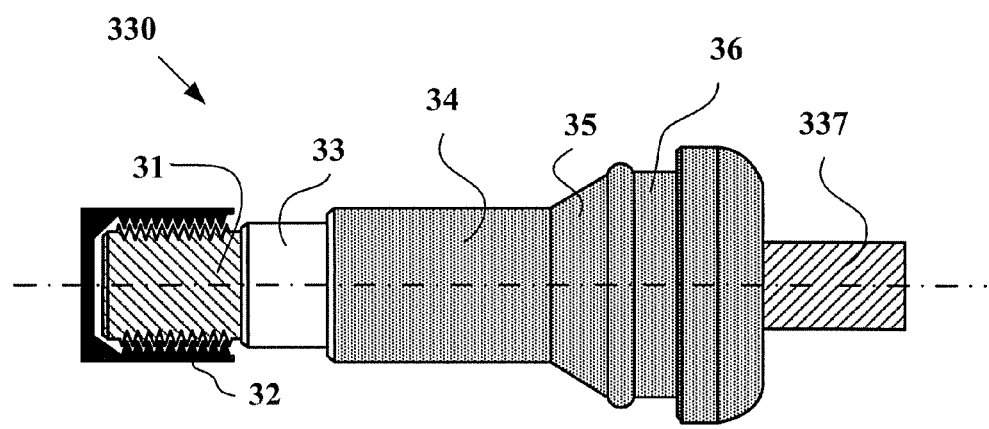
FIG. 6

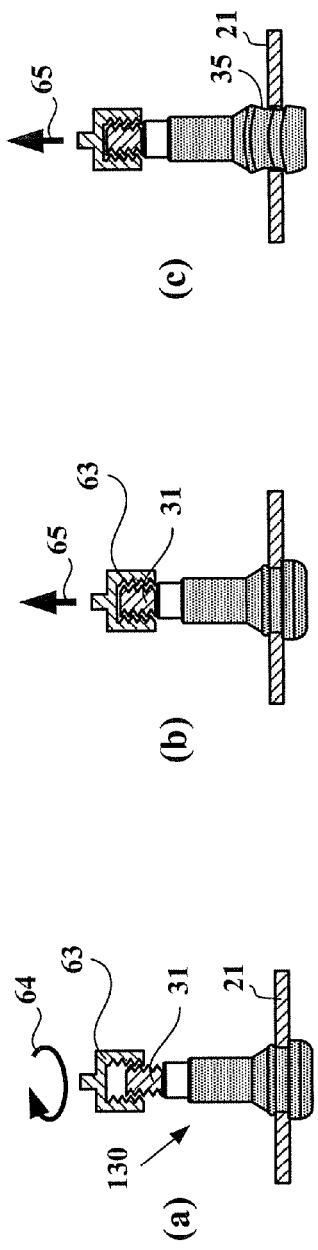
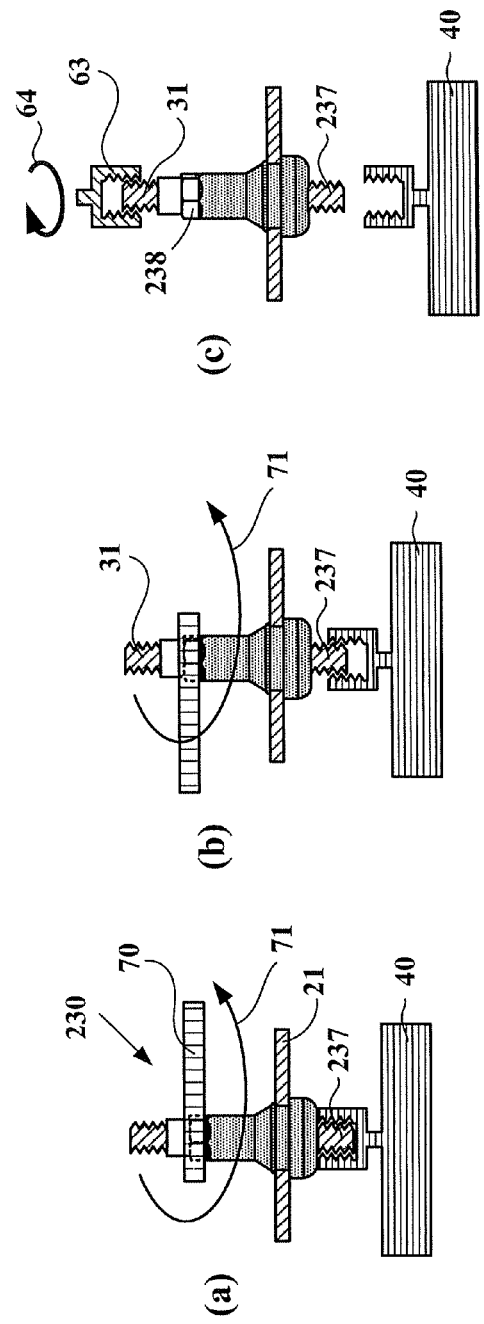
FIG. 8 - PRIOR ART
FIG. 9

TIRE VALVE AND PROCESS FOR REMOVING IT

FIELD OF THE INVENTION

The present invention concerns tyre inflation valves of the "snap-in" type and methods for fitting and removing such valves. More particularly, it concerns "snap-in" valves designed to be attached to electronic systems that enable certain utilisation parameters of the tyre to be measured and/or transmitted.

TECHNOLOGICAL BACKGROUND

In recent years there has been a rapid development of so-called "smart" tyres, i.e. tyres provided with electronic systems that enable certain parameters to be measured, such as the inflation pressure, the temperature of the tyre, or external forces exerted on the tyre during rolling. Such tyres are generally also provided with electronic systems that enable the measurements so obtained to be transmitted to the vehicle on which the tyre is mounted. For the sake of brevity, in what follows the measurement and/or transmission systems will be referred to indiscriminately as "electronic systems".

Such electronic systems are very often located inside the tyre. They can be fixed directly onto the tyre itself, for example in a pocket formed on an inside wall of the tyre; patent application U.S. Patent Application Publication No. 2005/0217774 describes an example of this. Another way to fix an electronic system inside a tyre is to use a "patch" which is glued onto an inside wall of the tyre (see for example the U.S. Pat. No. 6,782,741). A third possible approach is to attach the electronic system integrally to the tyre's inflation valve: U.S. Pat. No. 6,278,361 describes a design in which sensors are arranged in a case which is attached to the valve. The present invention relates to this third approach.

Nowadays many types of valves are available, which are designed for very different uses. In the field of passenger cars, in particular, valves are known which are fixed onto the wheel rim by screwing ("clamp-in" valves): the valve body is inserted into the valve hole from radially outside the rim (corresponding to the inside of the tyre volume after the tyre has been mounted) and is locked in place by a nut screwed on from radially inside the rim. The valve front has an annular recess to accommodate an annular sealing joint.

Another type of valve, which is fixed by clipping into place, is known as a "snap-in" valve. In such valves the (usually metallic) tube that encloses the actual valve mechanism is anchored in a valve body, for example made of rubber. The valve body has a peripheral groove to receive the edge of the valve hole. The invention concerns valves of this type, an example of which is shown in FIG. 1. An example of a "snap-in" valve comprising an electronic system is described in the U.S. Pat. No. 6,005,480. Other examples can be found in documents U.S. Pat. No. 6,851,308 and WO 2005/123421.

A "snap-in" valve is fitted (see also FIG. 7) before the tyre is mounted, by positioning the valve on the radially outer side of the rim (corresponding to the inside of the tyre volume after the tyre has been mounted), then inserting the head of the valve through the valve hole, and then using a tool to pull this valve head until the edge of the valve hole is engaged within the peripheral groove of the valve body. A liquid (for example soap solution) is generally applied during this operation to facilitate the fitting of the groove over the valve hole. Gas-tightness is ensured by leak proof contact between the edge of the valve hole and the valve body.

In general the valve is destroyed by removing it. For example, the same type of tool that was used to fit the valve is used to pull the valve head until the entire valve body comes out through the valve hole.

When an electronic system is attached to the valve, the valve is fitted in a strictly analogous manner taking care, however, not to damage the electronic system. Removal may be more complicated, especially when the electronic system is of some size. It is then necessary to separate the valve and the electronic system before the valve is removed. This may entail first taking off the tyre, with some risk of damaging the electronic system.

DESCRIPTION OF THE INVENTION

The purpose of the invention is to facilitate the removal of a "snap-in" valve attached to an electronic system that is too large or fragile to pass through the valve hole when the valve is being removed. In what follows, the electronic system and its case (if any) will be called the "unit designed to be fitted inside the tyre", or more simply, the "unit".

This objective is achieved by an inflation valve comprising a tube and designed for use on an assembly consisting of a tyre and a wheel (comprising a wheel rim), the valve comprising:
  snap-in means that enable the valve to be fixed in a cylindrical hole of circular cross-section formed in the wheel rim;
  means suitable for receiving a torque intended to rotate the valve in the hole;
  an attachment piece provided with means for attaching the valve to a unit designed to be fitted inside the tyre;
  wherein the means that enable the valve to be attached to the unit are such that the attachment piece is separated from the unit when the valve is rotated in the hole in a predetermined rotation direction.

It should be noted that a <<snap-in>> valve must not be rotated in the valve hole when mounted or during use, because this may damage the valve. Those skilled in the art, therefore, would hesitate to rotate the valve in the valve hole. The present invention is based on the finding that rotating the valve in its hole is acceptable when the valve is being removed, provided that the valve is not re-used subsequently.

The attachment piece may consist in an adaptation of one end of the tube. In this case the unit is fixed directly to the tube and integral with the tube. The advantage of this embodiment is that the overall number of parts is reduced and that the manufacture of the valve is more simple. Alternatively, the attachment piece may be a piece that is distinct from the tube.

Preferentially the means suitable for receiving a torque intended to rotate the valve in the valve hole are provided on the tube. This allows to take advantage of the rigidity of the tube.

In a first preferred embodiment the inflation valve is provided with a nut formed on the valve tube, this nut being suitable for receiving a torque intended to rotate the valve in the hole. The valve can then be rotated in the valve hole using traditional tools such as a flat spanner, so enabling the valve to be separated from the unit designed to be fitted inside the tyre without having to take off the tyre.

This embodiment has the additional advantage that a simple visual inspection of a tyre-wheel assembly from outside (i.e. without removing the tyre) allows to realize that a valve designed to be attached to an electronic unit (which is designed to be fitted inside the tyre) is being used, and to adapt the method for removing the tyre accordingly. Thus the accidental destruction of the unit by using an inappropriate tyre removal method can be avoided.

In a second preferred embodiment the valve has a valve mouth provided with an outer thread with a first screw pitch P1 (this being none other than the means suitable for receiving a torque intended to rotate the valve in the valve hole), and the predetermined rotation direction is the thread direction of the valve mouth. "Thread direction of the valve mouth" is here understood to mean the direction in which a suitable thread-tapped object (such as a valve protection cap) must be turned in order to screw it onto the valve mouth. Thus, when a suitable tool (such as a traditional valve-puller tool) is screwed onto the valve mouth and the rotation of the tool in the screwing direction is continued after the end of the thread of the valve mouth (or of the tool) has been reached, the valve is rotated in its valve hole and this enables the valve to be separated from the unit designed to be fitted inside the tyre, without having to take off the tyre.

The advantage of the second embodiment compared with the first is that operation is simpler and fewer tools are needed. There is no need for a nut on the tube, and this reduces its manufacturing cost.

In a particular embodiment the attachment piece is provided with means for attaching the valve to the unit by "rotational engagement", i.e. by a fixing method in which anchoring is established and released by a translation movement associated with rotation around the translation direction. This fixing method is commonly found in the field of electric connectors; a bayonet connector is a well known example of it. When the valve is rotated in the valve hole, for example through a quarter of a turn, the anchorage is released and offers no resistance to the movement which extracts the valve from its valve hole. Of course, attachment by "rotational engagement" can be used both with the first and the second embodiment described above.

In an alternative embodiment the attachment piece is provided with a thread having a second screw pitch P2, this thread enabling the valve to be attached to the unit by screwing, the thread axis of the attachment piece being substantially the same as the rotation axis of the valve in the valve hole. Note that the thread of the attachment piece can be internal (tapped hole) or external.

According to this embodiment the valve is released from the unit designed to be fitted inside the tyre by rotating the valve in the direction opposite to the screw pitch P2, so that the effect of the valve's rotation is to unscrew the unit from the valve.

When the valve has a valve mouth with an outer thread having a first screw pitch P1 and the attachment piece has a thread with a second screw pitch P2, it is preferable for the second screw pitch to be inverted relative to the first screw pitch. Thus, when a suitable tool is screwed onto the valve mouth and the tool continues being turned in the screwing direction after having reached the end of the thread on the valve mouth, the unit designed to be fitted inside the tyre will be unscrewed.

The invention also concerns a process for removing a valve comprising:
   snap-in means that enable the valve to be fixed in a cylindrical hold of circular cross-section formed in a wheel rim;
   means suitable for receiving a torque intended to rotate the valve in the hole;
   an attachment piece provided with means for attaching the valve to a unit designed to be fitted inside the tyre, the attachment piece being separated from the unit when the valve is rotated in the hole in a predetermined rotation direction;
the valve being mounted in a valve hole and attached to a unit designed to be fitted inside the tyre, the process comprising the following steps:
(A) a torque is applied to the means suitable for receiving a torque, so as to rotate the valve in the hole in the predetermined rotation direction until the valve is separated from the unit;
(B) the valve is pulled out from the rim.

Of course, this removal process will only work if the unit attached to the valve is not free to follow the rotation movement of the valve relative to the valve hole. Since the unit is generally larger in at least one direction perpendicular to the axis of the valve hole, it is blocked against the rim. If this is not the case, the rotation of the unit must be prevented in some other way, for example by holding it fast by hand.

Finally, the invention concerns a process for removing a valve that comprises:
   snap-in means that enable the valve to be fixed in a cylindrical hold of circular cross-section formed in a wheel rim;
   a valve mouth provided with an outer thread having a first screw pitch P1, which is suitable for receiving a torque intended to rotate the valve in the hole;
   an attachment piece provided with a thread having a second thread pitch P2, the thread enabling the valve to be attached to the unit by screwing, the thread axis of the attachment piece being substantially the same as the rotation axis of the valve in the valve hole, the attachment piece being separated form the unit when the valve is rotated in the hole in the direction opposite to the thread direction of the valve mouth;
the valve being mounted in a valve hole and being attached to a unit designed to be fitted inside the tyre, the process comprising the following steps:
(A) a valve-pulling (or equivalent) tool is screwed onto the valve mouth;
(B) after the end of the valve mouth thread has been reached, the turning of the tool is continued in the screwing direction so as to rotate the valve in the hole until the valve is separated from the unit;
(C) the valve is pulled out from the rim.

BRIEF DESCRIPTION OF THE DRAWINGS

The invention will be better understood from a description of the drawings, in which:

FIG. 4 shows schematically a prior art "snap-in" valve;

FIGS. 5 and 6 show schematically "snap-in" valves according to the invention;

FIG. 8 illustrates schematically the removal of a traditional "snap-in" valve;

FIGS. 9 and 10 illustrate schematically the removal of "snap-in" valves according to the invention.

DETAILED DESCRIPTION OF THE DRAWINGS

Figure 1:
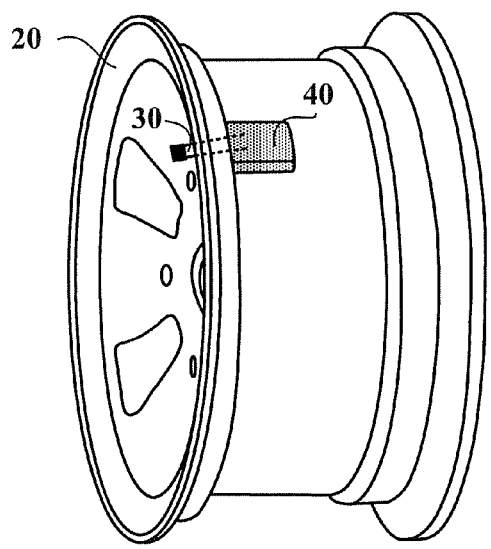
FIG. 1 shows a schematic perspective view of a wheel of the prior art, equipped with a unit designed to be fitted inside the tyre, attached to the inflation valve.

FIG. 1 shows a perspective view of a wheel 20 of the prior art, fitted with an inflation valve 30 and a case 40 provided in order to accommodate sensors. For the sake of clarity, the tyre 10 is not shown.

Figure 2:
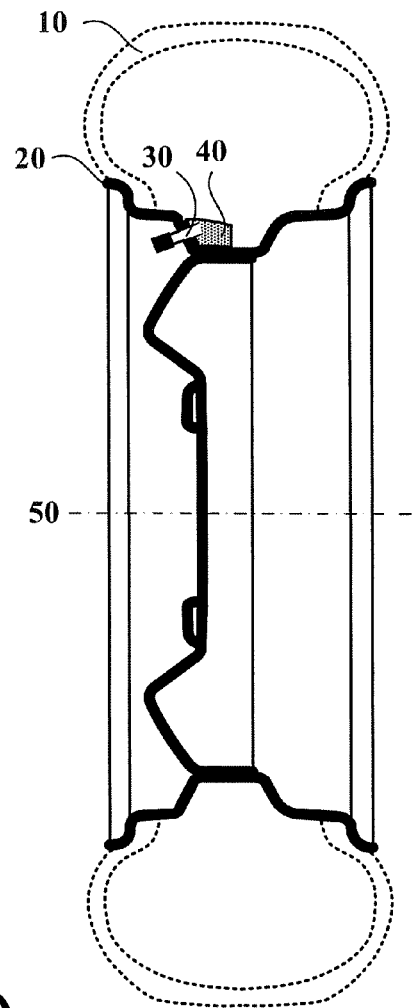
FIG. 2 shows a schematic sectional view of a tyre-wheel assembly of the prior art, equipped with a unit designed to be fitted inside the tyre, attached to the inflation valve.

FIG. 2 shows a sectional view of another tyre-wheel assembly of the prior art, consisting of a tyre 10 and a wheel 20 and fitted with an inflation valve 30 and a case 40 provided to accommodate sensors. The rotation axis 50 of the tyre-wheel assembly is also shown.

Figure 3:
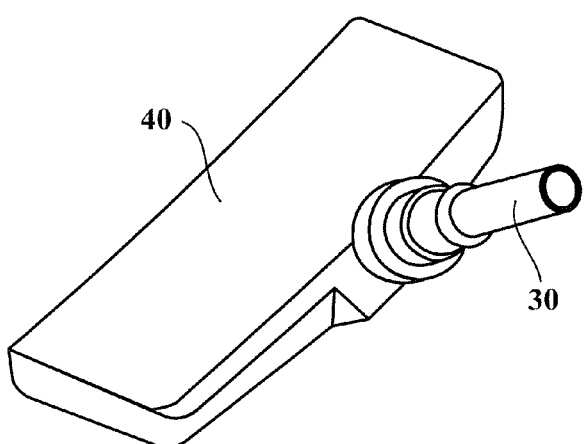
FIG. 3 shows a schematic perspective view of an inflation valve with a case attached to the valve, designed to accommodate sensors.

FIG. 3 shows a schematic perspective view of an inflation valve 30 and a case 40 attached to the valve and designed to accommodate sensors; such a case is known, for example from U.S. Pat. No. 6,278,361.

FIG. 4 shows schematically a prior art "snap-in" valve 130. This comprises:
- a valve mouth 31 provided with a right-hand thread onto which is screwed a cap 32 (shown in section so as not to hide the valve mouth). whose purpose is to protect the valve at times other than during inflation or deflation;
- a metallic tube 33 inside which is the actual valve mechanism;
- a sheath 34, for example of rubber, designed to protect the tube 33;
- a valve base 35 comprising a peripheral groove 36 provided in order to receive the edge of the valve hole.

The valve 130 can also comprise a piece 137 which enables the fixing onto the valve 130 of a unit designed to be fitted inside the tyre.

Figure 7:
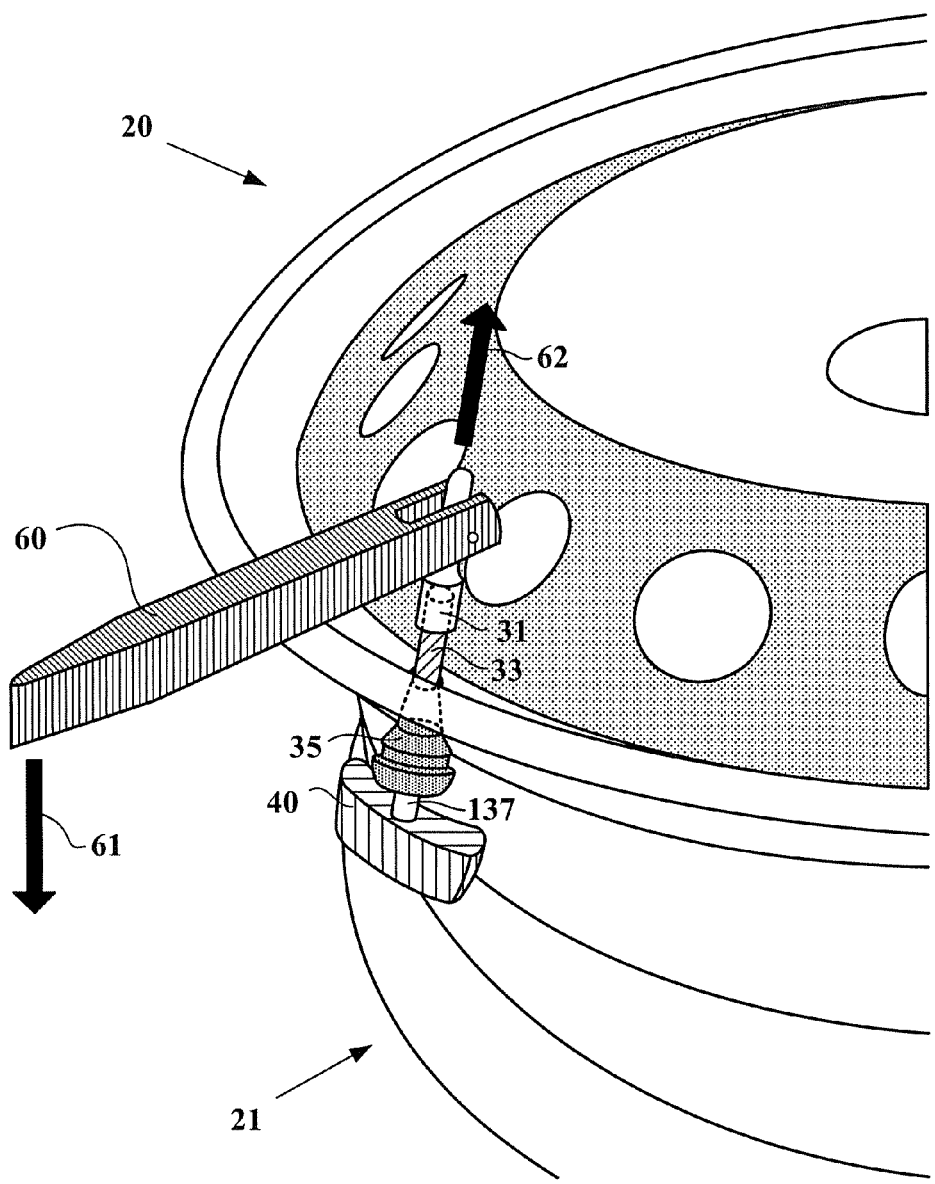
FIG. 7 illustrates schematically a step in the fitting of a "snap-in" valve attached to a case containing an electronic system.

FIG. 7 illustrates schematically a step in the fitting of a "snap-in" valve 130 (see FIG. 4) attached to a case 40 containing an electronic system. The valve 130 is fitted before the tyre 10 has been mounted. The valve 130 is positioned on the radially outer side of the rim 21 (corresponding to the inside of the tyre's volume after the tyre has been mounted), and the valve mouth 31 is then inserted through the valve hole. Then, the end of a tool 60 is screwed onto the valve mouth 31 and the valve is pulled (in the direction 62) using the tool as a lever, by applying a force in the direction indicated by the arrow 61. Thus, the groove 36 (see FIG. 4) of the valve base engages with the valve hole. In general a liquid (for example, soap solution) is applied during this operation to facilitate the fitting of the groove into the valve hole. Gas-tightness is ensured by leak proof contact between the edge of the valve hole and the valve base 35.

FIG. 8 illustrates schematically the removal of the "snap-in" valve 130. Once the cap 32 (see FIG. 4) has been removed from the valve mouth 31, the end 63 of a tool equivalent to the tool 60 in FIG. 7 is screwed onto the valve mouth 31 (FIG. 8(*a*)). Since the valve mouth 31 is threaded with a right-hand pitch, screwing is carried out clockwise (arrow 64). When the end 63 of the tool is fully screwed onto the valve mouth 31, the valve 130 is pulled free of its engagement in the rim 21 (arrow 65), for example by using the tool 60 of FIG. 7 as a lever (FIG. 8(*b*)). FIG. 8(*c*) shows the deformation undergone by the valve base 35 as the valve 130 comes out of the valve hole; in general, the valve can no longer be used after this operation.

Of course, the removal process of FIG. 8 is no longer suitable when an electronic system is attached to the valve 130. While the valve 130 is coming out of the valve hole, the case containing the electronic system would be likely to hit against the rim and might even be severely deformed or torn off. It is therefore necessary to remove the tyre 10 and separate the valve 130 from the electronic system before proceeding as described in FIG. 8. However, there is a non-negligible risk that the electronic system could be damaged during the removal of the tyre 10.

FIGS. 5 and 6 show valves 230 and 330 according to the invention, which overcome this difficulty.

FIG. 5 shows a valve 230 in which a nut 238 has been formed on the tube 33. In the example shown this is a hexagonal nut, but any other nut suitable for receiving a torque (nut with two flats, star-shaped nut) could also be formed on the tube. FIG. 9 shows a removal process made possible by the valve 230. The first step is to unscrew the case 40 using a flat spanner 70 that fits the nut 238 (FIG. 9(*a*)). The case is large enough to prevent it from rotating all the way round without being blocked against the rim. Thus, the application of a torque in the counter-clockwise direction (arrow 71) enables the case 40 to be unscrewed from the attachment piece 237, which has a right-hand thread (FIG. 9(*b*)). When the case 40 has been separated from the valve 130 (FIG. 9(*c*)), the removal of the valve 130 can be completed as described in FIG. 8 by screwing the end 63 of a tool onto the valve mouth 31 (arrow 64) and then pulling the valve 230 as in FIG. 8(*c*)). Note that this removal process does not require the prior removal of the tyre 10.

Nevertheless, the use of a valve such as the valve 230 has certain disadvantages. A valve 230 with a nut 238 is more expensive than one such as the valve 130. Moreover, the removal process involves the use of two different tools (a valve-puller tool and a flat spanner), and this is likely to make the process more time-consuming.

This drawback is overcome by the valve 330 shown in FIG. 6. The special feature of this valve is that the thread on the attachment piece 337 is inverted relative to the thread on the valve mouth 31. Since a right-hand thread is specified for the valve mouth 31 by the standards in force (for example, the ETRTO standards), it is generally preferable to use a left-hand thread for the attachment piece 337, but this is in no way a limiting characteristic, the important thing being to invert the thread on the attachment piece 337 relative to the thread on the valve mouth 31.

Figure 10:
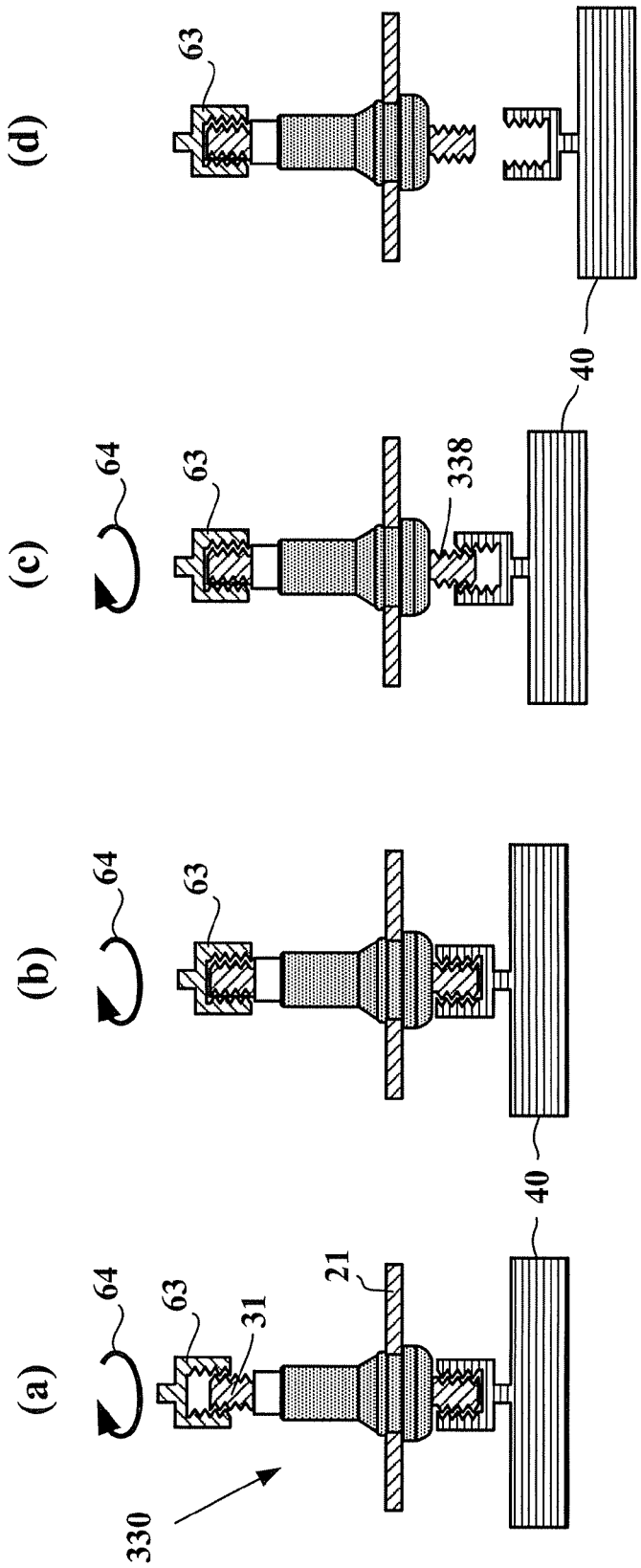

FIG. 10 illustrates a corresponding removal process. In a first step the end 63 of a tool equivalent to the tool 60 of FIG. 7 is screwed onto the valve mouth 31 (FIG. 10(*a*)). Screwing is carried out clockwise (arrow 64). When the end 63 is fully screwed onto the valve mouth 31 (FIG. 10(*b*)), and in contrast to the process shown in FIG. 8, the rotation of the end 63 is continued without changing the rotation direction. If the case 40 is large enough to prevent it from rotating all the way round without being blocked by the rim, the application of a torque begins unscrewing the case 40 from the attachment piece 338 (FIG. 10(*c*)). If the thread direction of this piece 338 had been the same as that on the valve mouth 31, the result of this operation would have been to tighten the case 40 even more onto the attachment piece 338, but since the thread is inverted the case 40 is unscrewed from the attachment piece 338. When the case has been completely separated from the valve 330 (FIG. 10(*d*)), the process continues as in FIG. 8 by pulling the valve 230 as in FIG. 8(*c*). Note that this removal process does not require the prior removal of the tyre 10; it can be carried out using just one tool of a type well known in tyre fitting centres and garages for automobiles.

For reasons to do with ease of representation, the figures illustrating the invention only show valves that enable the case/unit 40 to be attached by screwing. It is of course possible to obtain the same results with systems in which fixing takes place by "rotational engagement", as described earlier.

The invention claimed is:

1. An inflation valve comprising a tube and designed to be used on an assembly consisting of a tire and a wheel, the valve comprising:
 - snap-in means that enable the valve to be fixed in a cylindrical hole of circular cross-section formed in a rim of the wheel;
 - a valve tube, comprising a valve mouth provided with an outer thread having a first thread pitch P1 and wherein the predetermined rotation direction is the direction of the thread on the valve mouth, wherein said outer thread is suitable for receiving a torque intended to rotate the valve in the hole;
 - an attachment piece provided with a thread having a second screw pitch P2, this thread enabling the valve to be attached to the unit by screwing, the thread axis of the attachment piece being substantially the same as the rotation axis of the valve in the valve hole, and wherein the second thread P2 is inverted relative to the first thread P1;
 - wherein the thread enabling the valve to be attached to the unit is such that the attachment piece is separated from the unit when the valve is rotated in the hole in a predetermined rotation direction.

2. The inflation valve of claim 1, wherein the attachment piece is distinct from the tube of the valve.

3. A process for removing the valve of claim 1, the valve being fitted in a valve hole and attached to a unit designed to be fitted inside the tire, the process comprising the following steps:
 - (A) applying a torque to the outer thread, so as to rotate the valve in the hole in the predetermined rotation direction until the valve is separated from the unit;
 - (B) extracting the valve from the rim by pulling.

4. A process for removing the valve according to claim 1, the valve being fitted in a valve hole and attached to a unit designed to be fitted inside the tire, the process comprising the following steps:
 - (A) screwing a valve-puller tool onto the valve mouth;
 - (B) after reaching the end of the outer thread on the valve mouth, continuing the rotation of the valve-puller tool in the screwing direction, rotating the valve in the hole until the valve is separated from the unit;
 - (C) extracting the valve from the rim by pulling.

* * * * *